Patented Dec. 1, 1931

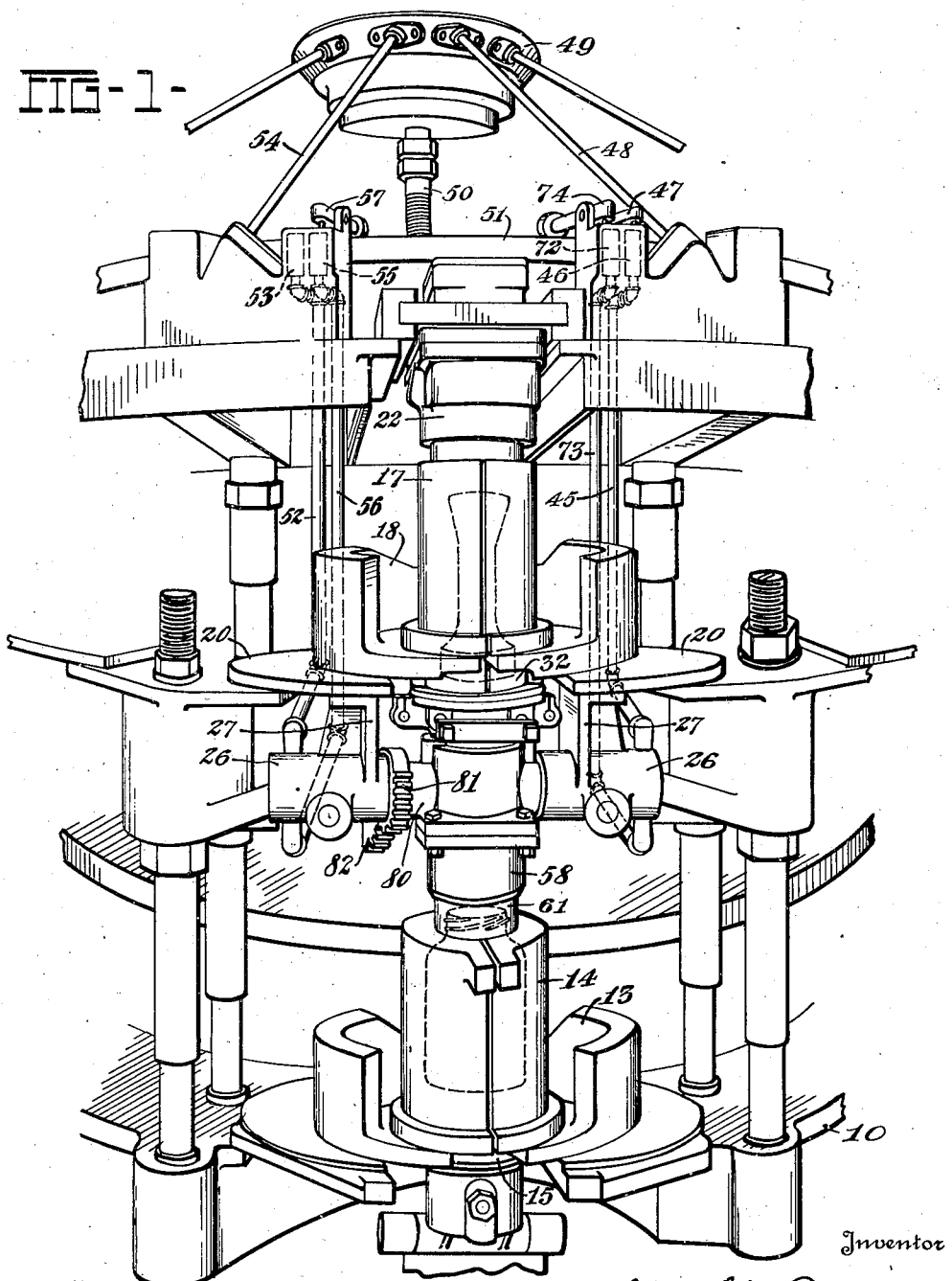

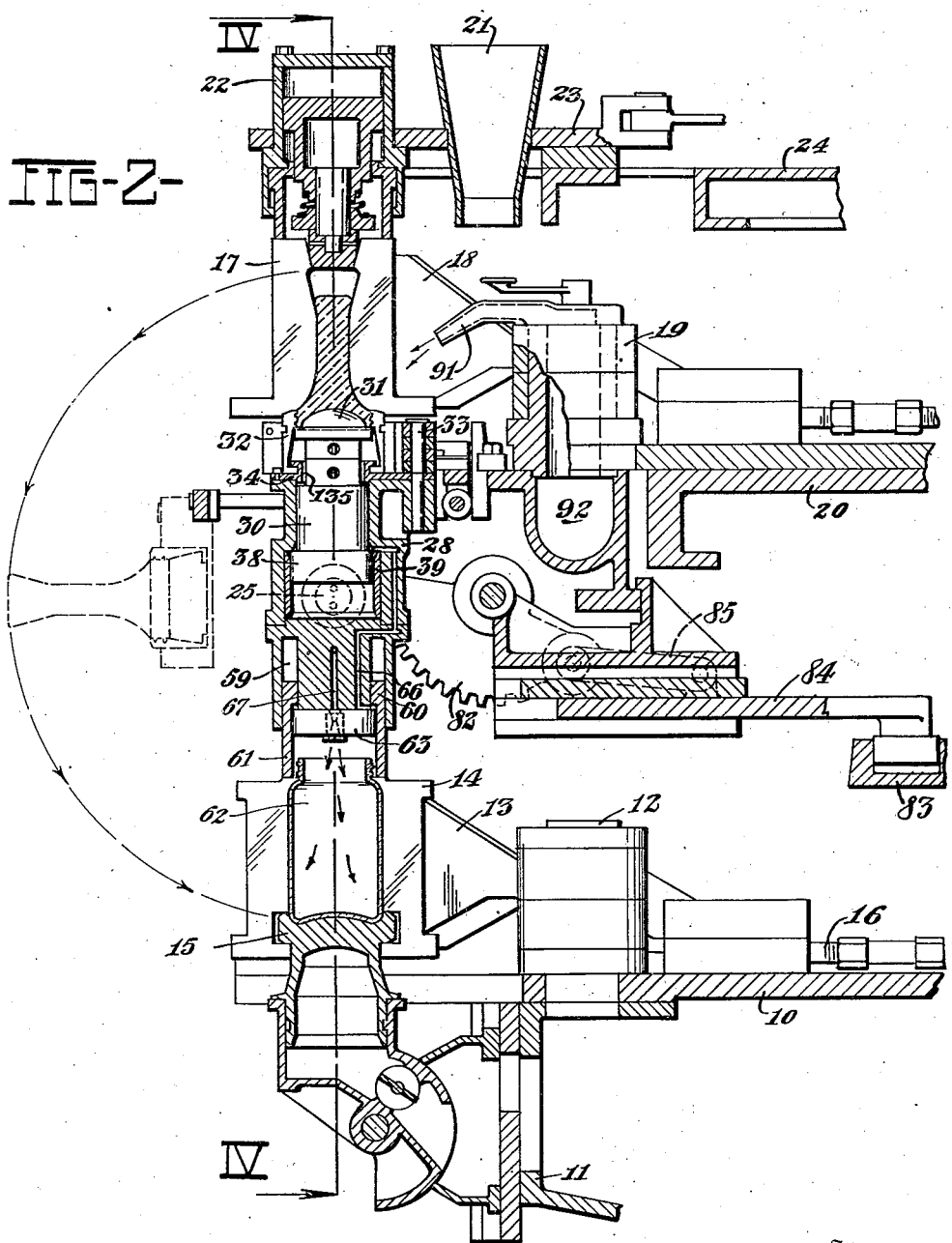

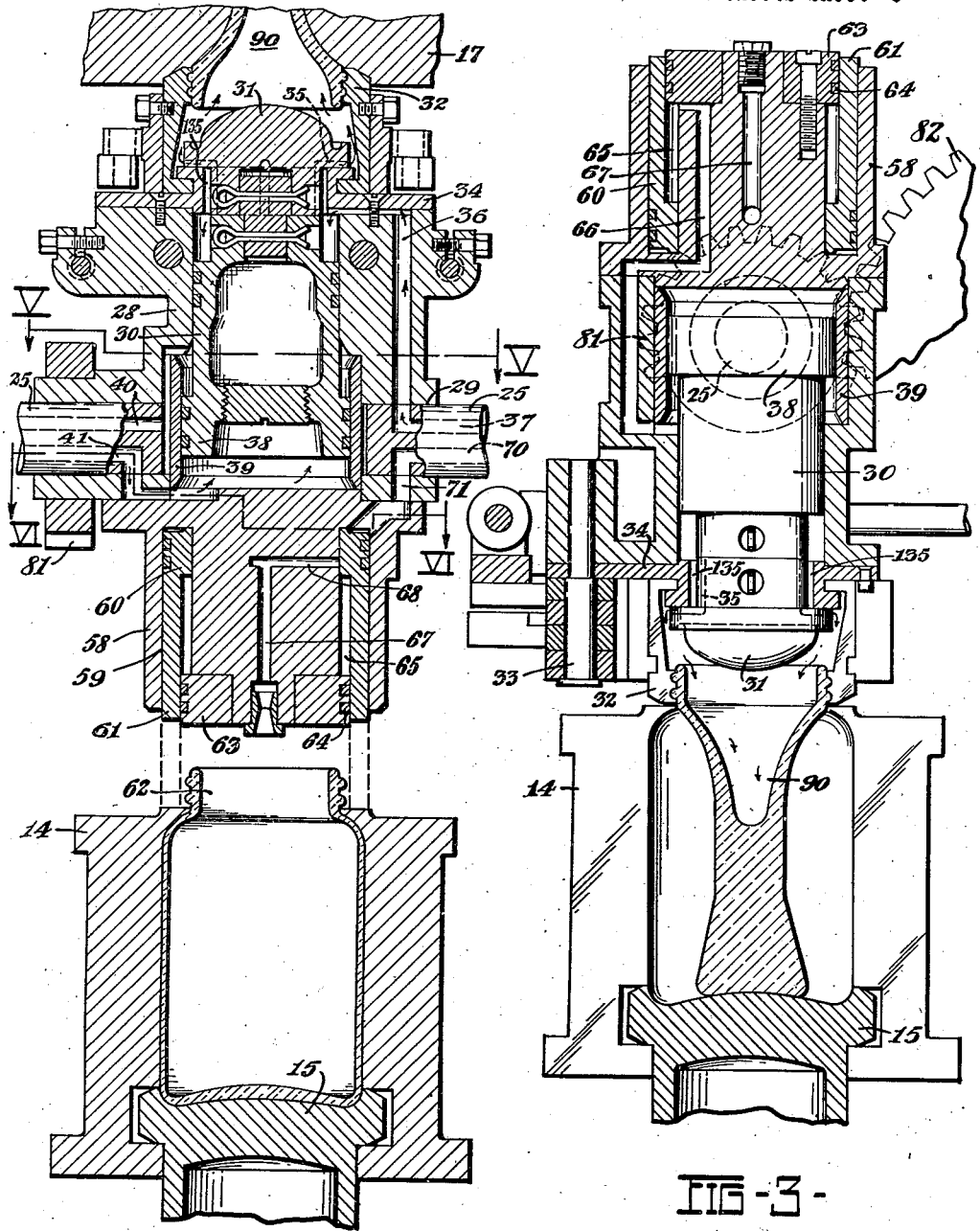

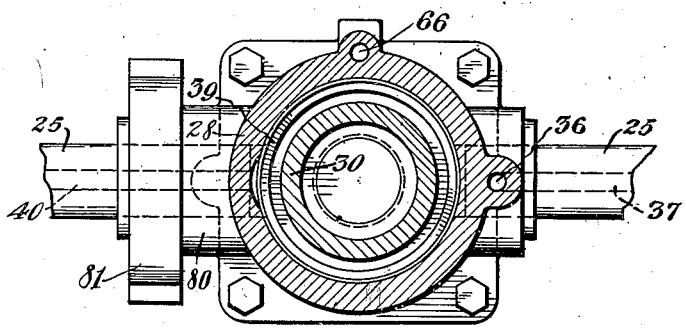
FIG-5-
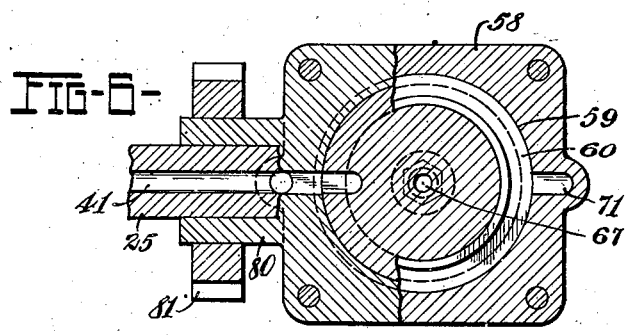
FIG-6-
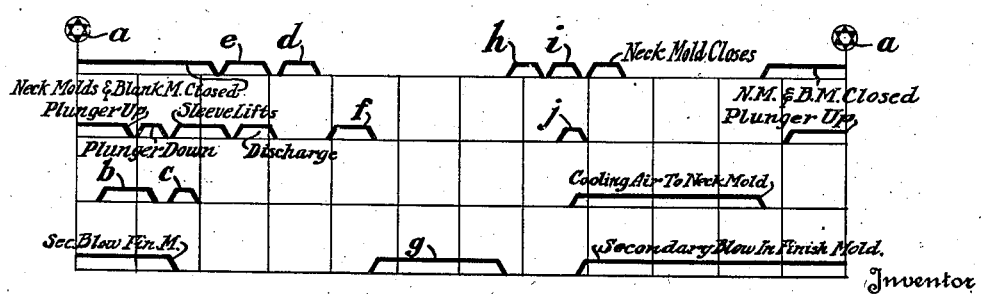
FIG-7-

1,834,384

UNITED STATES PATENT OFFICE

ALBERT N. CRAMER, OF TOLEDO, OHIO, ASSIGNOR TO OWENS-ILLINOIS GLASS COMPANY, OF TOLEDO, OHIO, A CORPORATION OF OHIO

GLASSWARE FORMING MACHINE

Application filed December 14, 1927. Serial No. 239,854.

The present invention relates to improvements in glassware forming machines and more particularly to means to insure complete shaping and setting of glass articles while in the finish or blow mold. To this end, there is provided means to prolong or extend the final blow in the finish molds whereby the article blown therein is more fully set when ejected from the mold than where produced on the average machine. To this end, the turnover unit of the machine embodying the present invention is formed with means to enclose the ordinarily exposed neck of the blown article in the finishing mold and through this enclosing means, apply air pressure internally of the blown article up to a point substantially at the mold opening and ware ejecting station. This secondary or extended blow applied to a blown blank, takes place during the formation of a blank in the blank mold of a corresponding mold unit. Accordingly, it is evident that by utilizing the present invention, production of ware may be increased, since the ejected ware is sufficiently set to prevent its collapse.

A further object is to provide means for prolonging the cooling period of the neck molds and plunger associated therewith.

Other objects will be apparent hereinafter.

In the accompanying drawings:

Fig. 1 is a detail perspective view showing one mold unit of a gravity fed machine embodying the present invention.

Fig. 2 is a vertical central sectional view of a portion of one head embodying the present invention.

Fig. 3 is a detail sectional view showing the position of the various elements, substantially at the moment the finish molds close about a parison.

Fig. 4 is a view similar to Fig. 3 taken on line IV—IV (Fig. 2), showing the turnover unit reinverted to form another parison while the previously formed parison is being subjected to a secondary blow.

Fig. 5 is a sectional view at the line V—V of Fig. 4.

Fig. 6 is a transverse sectional view at the line VI—VI of Fig. 4.

Fig. 7 illustrates the cycle of operations, and the relation between the several blowing stations.

In the drawings, which illustrate the preferred embodiment of my invention, the ware forming machine shown is of the gravity fed type including an annular series of mold units rotatable about a vertical axis. The structure includes a series of vertically spaced tables, the lower table 10 being supported on a suitable base 11, and carrying a vertical hinge pin 12 upon which finish mold arms 13 are fulcrumed. These arms carry finish mold sections 14 at their outer ends to cooperate with a bottom plate 15 hinged to the base 11 for vertical swinging movement into and out of cooperative relation with the finish mold 14 under influence of a cam or the like (not shown). The finish mold sections 14 are brought into cooperative relation with each other and with the bottom plate 14 at regular intervals by means of a cam (not shown) which moves the mold sections 14 through the medium of a link 16 (Fig. 2).

A partible two section blank mold 17 is arranged above the finish mold 14, the former being mounted on arms 18, suitably connected to a bearing 19 on a blank mold table 20. This blank mold is opened periodically in timed relation to the finish mold movements, by mechanism of any preferred or standard type (not shown). A funnel guide 21 and blow head 22 are mounted on a support 23 slidable radially on the top section 24 of the mold carriage, said funnel guide and blow head being alternately positioned for cooperation with the blank mold 17 during delivery of molten glass to the blank mold cavity and transformation thereof into a blank or parison. The blowing head 22 and the mechanism above described embody construction and method of operation substantially as set forth in detail in my Patent Number 1,693,069, November 27, 1928, to which reference may be made for details.

A turnover unit is interposed between each pair of vertically spaced blank and finish molds 17 and 14, respectively, said unit being journalled on stub shafts 25 extending inwardly from bearing blocks 26 on the lower ends of brackets 27, suspended from the intermediate table 20. This turnover unit (Fig. 4) comprises an air motor including a cylinder 28 formed with transversely aligned shaft openings 29 in which the stub shafts 25 are rotatively disposed. A reciprocable differential piston 30 in the cylinder removably carries at its upper end, a plunger 31 which at times extends into the neck mold 32, the latter being mounted on a hinge pin 33 (Fig. 2) and operable by a mechanism of the type disclosed in my Patent 1,693,069 above referred to.

The neck mold is carried by the cylinder head 34, the latter formed with an opening 135 through which a portion of the differential piston 30 extends for attachment to the plunger 31. This plunger (Figs. 3 and 4) is formed with channels 35 which communicate at times with the upper end of a passageway 36 extending longitudinally in the motor cylinder wall. This passageway 36 communicates, while the turnover unit is in the position shown in Fig. 4, with a longitudinal opening 37 in one of the stub shafts 25 during the formation of a blank in the mold 17. Through these intercommunicating passageways 36 and 37 and the channels 35, variable air pressure is periodically applied to the glass in the blank and neck molds.

The lower enlarged end 38 of the piston 30 reciprocates in a sleeve 39 (Fig. 4), the open upper end of said sleeve constantly communicating through a channel 40 in one of the stub shafts 25 with a source of air pressure supply (not shown). The open lower end of the sleeve 39 communicates through a passageway 41 in said stub shaft with a source of air pressure supply (not shown). Since the area of the piston 30 exposed to the variable air pressure supplied through the passageway 41 is greater than that exposed to the constant air pressure through the passageway 40, periodic application of air pressure through the passageway 41 lifts the piston at intervals to project the plunger 31 into the neck mold.

Air pressure supplied to the intercommunicating passageways 36 and 37 (Fig. 4) to form the initial blow opening in the blank flows periodically through a pipe 45 (Fig. 1) from a chamber 46 provided with a flow control valve 47, said chamber receiving air pressure through a pipe 48 from the distributing head 49 which is connected to a main supply pipe 50. This valve 47 and others to be described are actuated at regular intervals by cams 51. Constant air pressure is supplied to the upper end of the sleeve 39 to lower the piston 30, and to the lower side of a ring piston 60 (Fig. 4) to hold the latter in its uppermost position, as will be described, through a pipe 52 from a chamber 53 which communicates with the distributing drum 49 through a branch pipe 54. Air pressure applied at regular intervals to the lower end of the plunger carrying piston 30 to raise the latter is supplied to the channel 41 (Fig. 4) from a chamber 55 by way of a pipe 56, said chamber 55 being provided with a valve 57 and communicating with the air pressure distributing drum 49 through said pipe 54. This valve 57 (as are the other valves) is cam controlled and operates at regular intervals to lift the plunger up into the neck mold 32.

The motor cylinder is formed with a depending extension 58 having an annular longitudinally extending channel 59 in which a differential ring piston 60 is arranged, the latter formed with a depending sleeve 61 which at times is moved downwardly to rest upon the upper end of a finishing mold 14 and encloses the upper end of an article of glassware 62 in the mold. A retaining ring 63 (Fig. 4) is suitably fixed to the lower end of the extension 58 internally of the sleeve 61 and carries packing rings 64 which contact with the inner face of said sleeve.

The sleeve 61 and differential piston 60 are normally held in their uppermost positions by the application of constant air pressure to the lower side of the piston 60 through an annular chamber 65. This chamber 65 communicates through a passageway 66 with the chamber at the upper end of the sleeve 39 and therethrough with the longitudinal passageway 40 in the stub shaft 25 as above described. An axial opening 67 is formed in the depending extension 58 (Fig. 4), the latter connected to a lateral passageway 68 which at times opens into the annular channel 59 in which the piston 60 is mounted. Variable air pressure is supplied to these last named passageways 67 and 68 to lower the sleeve 61 and apply a secondary blow to the parison in the finishing mold, by way of a longitudinal opening 70 (Fig. 4) in one of stub shafts 25 and a lateral port 71 which communicates with the upper end of said annular channel 59. Air pressure is supplied to the passageway 70 from the chamber 72 (Fig. 1) by way of a pipe 73. Flow of air pressure through the pipe 73 is controlled by a cam actuated valve 74 mounted on the chamber 72 which communicates with the air pressure distributing drum 49 through the pipe 48.

One of the trunnions 80 (Fig. 1) on the turnover unit carries a pinion 81 running in mesh with a gear segment 82, the latter being oscillated at regular intervals by a cam 83 (Fig. 2), operating through a slide 84 and link 85. This feature and the air pressure control in general are similar to the disclosures in my Patent 1,693,069, above mentioned, to which reference may be made for details.

In forming glassware on a machine embodying the above features, a charge or unit of glass is dropped into the blank mold through a funnel guide 21 at the charging station "a" (Fig. 7), it being understood that at this station the turnover unit and associated elements are positioned substantially as shown in Fig. 2, the exception being that the funnel guide 21 is in register with the blank mold 17 in place of the blow head 22. The charge of glass is packed in the neck mold and lower end of the blank mold by the application of air pressure through the blow head 22 at the station "b" to thereby completely fill and pack molten glass into the neck mold 32. Continued rotation of the mold carriage brings the valve 47 (Fig. 1) to a station (not shown) on the cam 51 at which said valve is opened, permitting application of air pressure through the intercommunicating passageways 36 and 37. Thus, air pressure is applied at station "c" (Fig. 7) through the channels 35 formed in the plunger 31 to the mold charge to thereby form an initial blow opening 90 in the blank or parison and thereby completely form the parison. Just prior to this application of blow-up air, the flow of air pressure to the lower side of the piston 30 by way of the passageway 41 is discontinued to thereby allow the constant air pressure applied through the passageway 40 to lower the piston 30 and thereby move the plunger 31 out of contact with the glass. The valve 47 closes as it passes beyond a given station (not shown) on the cam 51 and at this point, station "d", the gear segment 82 is partially rotated to invert the turnover unit, thereby swinging the bare parison downwardly to a pendent position in which it may be enclosed in the finish mold 14. The blank mold 17 is opened at station "e" in the usual manner. The finish mold 14 is now closed about the depending parison at station "f" and while the plunger 31 (Fig. 3) is still held in its uppermost position relative to the parison, the valve 74 (Fig. 1) is opened, allowing application of final blowing air through the pipe 73, passageways 70 and 71, the longitudinal passageway 36 in the cylinder wall and thence through the channels 35 into the initial blow opening 90 at station "g". Thus, the parison is blown to the shape of the finish mold cavity. Immediately following this final blow, the valve 74 is closed and the neck mold is opened at station "h" by a device fully illustrated in the above identified patent but forming no part of the present invention. At this point, station "i", the turnover unit is reinverted and the plunger 31 and neck mold 32, are subjected to blasts of cooling air applied through a nozzle 91 (Fig. 2) which receives its supply of cooling air by way of a chamber 92. Simultaneously with reinversion of the turnover unit, the neck mold closes and the valve 74 (Fig. 1) is again opened, allowing air pressure to flow through the pipe 73, opening 70 in the stub shaft 25 and the lateral port 71. From this point (Fig. 4), the air pressure enters the upper end of the annular channel 59 to thereby lower the ring piston 60 and sleeve 61 carried thereby and seat the sleeve upon the upper end of the finish mold at station "j", thereby enclosing the bare neck of the blown parison. Such lowering of the sleeve 61 and ring piston 60 provides communication between the port 71 and the intercommunicating passageways 67 and 68 (Fig. 4) so that air pressure may be applied internally of the blown article. This secondary blow (Fig. 7) is continued to a point just in advance of opening of the finish mold 14 at the ware ejecting station.

The blank mold 17 is closed just prior to arrival at the charging station, and the valve 57 (Fig. 1) is opened to apply air pressure to the lower side of the piston 30 and thereby raise the plunger 31 into the neck mold as shown in Fig. 2. Due to the fact that the turnover unit is reinverted immediately upon initial blowing and shaping of the parison in the finish mold, the neck mold and plunger tip are subjected to cooling air during approximately ninety degrees of movement of the mold carriage to thereby better condition the neck mold and plunger for contact with the new charge of glass. A charge of glass is dropped into the blank and neck molds and given a compacting blow while the secondary blow is being applied to the blown parison in the finish mold of the same mold unit, and the cycle of operations above described is repeated.

Modifications may be resorted to within the spirit and scope of the appended claims.

What I claim is:

1. A glassware forming machine comprising an annular series of ware forming units each including a turnover unit, a blank mold above the unit, a finish mold below said unit, means to form a blank in the blank mold, means to invert the turnover unit and position the blank in the finish mold, means to blow the blank to its final form in the finish mold, means to reinvert the turnover unit to form another parison, and means including a conduit in the turn-over unit to apply additional air internally of the blown parison in the finish mold after reinversion of said turnover unit.

2. A glassware forming machine comprising an annular series of ware forming units each including a gravity fed blank mold, a finish mold, a turnover unit adapted to transfer blanks to the finish mold, means to blow the blank to final form in the finish mold, and means in part carried by the turnover unit to apply air internally of the blown blank in the finish mold after said blow to final form.

3. A glassware forming machine comprising an annular series of ware forming units each including a gravity fed blank mold, a finish mold, a turnover unit adapted to transfer blanks to the finish mold, means to blow the blank to final form in the finish mold, and means carried in part by the turnover unit to apply additional air pressure internally of the blown blank in the finish mold while a blank is being formed in the blank mold of the corresponding unit.

4. A glassware forming machine comprising an annular series of ware forming units rotatable about a vertical axis, each unit including a gravity fed blank mold, a finish mold therebelow, a turnover unit between said molds, means to invert the turnover unit at intervals to transfer a blank to the finish mold, means to blow the blank to its final form through the turnover unit while the latter is inverted, means to reinvert the turnover unit, and means carried in part by the lower end of the turnover unit to apply additional air pressure internally of the blown blank while the latter is enclosed in the finish mold.

5. A glassware forming machine comprising an annular series of ware forming units rotatable about a vertical axis, each unit including a gravity fed blank mold, a finish mold therebelow, a turnover unit between said molds, means to invert the turnover unit at intervals to transfer a blank to the finish mold, means to blow the blank to its final form through the turnover unit while the latter is inverted, means to reinvert the turnover unit, means carried in part by the lower end of the turnover unit to apply additional air pressure internally of the blown blank while the latter is enclosed in the finish mold, said last named means including a vertically movable sleeve, and means to position the sleeve at regular intervals to enclose that portion of the parison projecting above the finish mold.

6. A glassware forming machine comprising an annular series of ware forming units rotatable about a vertical axis, each unit including a gravity fed blank mold, a finish mold therebelow, a turnover unit between said molds, means to invert the turnover unit at intervals to transfer a blank to the finish mold, means to blow the blank to its final form through the turnover unit while the latter is inverted, means to reinvert the turnover unit, a differential piston mounted in the lower end of the turnover unit, a sleeve carried by the piston, and means to periodically actuate the piston to position the sleeve to enclose the upper end of a blown blank in the finish mold, said last named means also operating to apply air internally of the blown blank in the finish mold.

7. A glassware forming machine comprising an annular series of ware forming units each including an oscillatively mounted turnover unit, a neck mold at one end of the unit, an extensible sleeve at the other end of said unit, blank and finish molds associated with the turnover unit, and means to apply air pressure through the neck mold and said sleeve to form a parison in the blank mold and apply air internally of a blown blank in the finish mold.

8. In a glassware forming machine, a turnover unit, a neck mold at one end thereof, an extensible sleeve mounted on the other end of said unit and adapted to enclose the neck portion of a blown blank in a finish mold, and means to direct air pressure through the outer end of said sleeve into the blown blank.

9. In a glassware forming machine, a turnover unit, a neck mold at one end thereof, an extensible sleeve mounted on the other end of said unit and adapted to enclose the neck portion of a blown blank in a finish mold, means to direct air pressure through the outer end of said sleeve into the blown blank, and a differential sleeve operating piston forming a part of the connection between said sleeve and turnover unit.

10. In a machine for forming glass articles, the combination of a mold carriage, a blank mold and a finishing mold thereon, a parison transfer device on said carriage including a neck mold, means for moving said transfer device and thereby shifting the neck mold from a position in register with the blank mold to a position in register with the finishing mold, means for supplying air under pressure to said transfer device and directing it through the neck mold to the blank mold for blowing a parison in the blank mold when the neck mold is in register with the blank mold, means for directing air under pressure through the neck mold to the finishing mold when the neck mold is in register with the finishing mold and thereby blowing the parison in the finishing mold, means for again moving the transfer device to return the neck mold to its position in register with the blank mold, and means for directing air under pressure through said transfer device to the blown article in the finishing mold after said return of the neck mold.

Signed at Toledo, in the county of Lucas and State of Ohio, this 10th day of December, 1927.

ALBERT N. CRAMER.